United States Patent [19]

Vasta

[11] 3,976,617

[45] *Aug. 24, 1976

[54] CORROSION INHIBITING SYSTEM CONTAINING ZINC AND ZINC PHOSPHATE

[75] Inventor: Joseph A. Vasta, Woodbury, N.J.

[73] Assignee: E. I. Du Pont de Nemours and Company, Wilmington, Del.

[ * ] Notice: The portion of the term of this patent subsequent to Jan. 8, 1991, has been disclaimed.

[22] Filed: June 13, 1974

[21] Appl. No.: 478,967

Related U.S. Application Data

[63] Continuation of Ser. No. 252,352, May 11, 1972, abandoned.

[52] U.S. Cl. .............................. 260/39 R; 260/37 M; 260/37 EP; 260/42.22; 260/834
[51] Int. Cl.² ........................ C08K 3/08; C08K 3/32
[58] Field of Search .......... 106/290, 14; 117/16 OR; 260/37 M, 834, 39 R, 37 EP, 42.22

[56] References Cited
UNITED STATES PATENTS

| | | | |
|---|---|---|---|
| 3,324,069 | 6/1967 | Koblitz et al. | 260/31.4 |
| 3,784,506 | 1/1974 | Vasta | 260/834 X |

FOREIGN PATENTS OR APPLICATIONS

| | | |
|---|---|---|
| 315,322 | 9/1956 | Switzerland |

*Primary Examiner*—Lewis T. Jacobs
*Assistant Examiner*—S. M. Person

[57] ABSTRACT

A galvanic action corrosion-inhibiting system which comprises particulate zinc and a water-insoluble zinc salt, useful in coating compositions, particularly coating compositions used to coat interiors of water heater tanks.

4 Claims, No Drawings

CORROSION INHIBITING SYSTEM CONTAINING ZINC AND ZINC PHOSPHATE

CROSS-REFERENCE TO RELATED APPLICATIONS

This application is a continuation of application Ser. No. 252,352, filed May 11, 1972 and now abandoned.

BACKGROUND OF THE INVENTION

Particulate zinc is a known corrosion inhibitor, widely used in industrial maintenance paints where its selective galvanic action protects substrates against corrosion.

Although these paints give excellent results, they do not satisfactorily inhibit "bleeding", which occurs when a steel substrate, coated with such a zinc-containing paint, shows exposed metal through accident or failure of the film and is exposed to chlorides[1]. This bleeding occurs in paints containing as much as 50%, by weight of the binder components, of zinc and is still a problem when zinc levels reach as high as 80%, by weight of the binder.

[1]. By "bleeding" I mean the exudation of rust or other oxides from the wound. This exudate can discolor the finish, and, if it occurs in a container, may contaminate the container's contents.

I have now found that bleeding is significantly reduced and that a greatly enhanced galvanic action corrosion-inhibiting effect is obtained if a water-insoluble zinc salt is used in conjunction with particulate zinc in these coating compositions. This combination of zinc and water insoluble zinc salt forms a corrosion-inhibiting system which I have found to be useful with many types of binder components. I have found the system to be especially useful in compositions designed to give finishes with great resistance to degradation on exposure to boiling water, such as those used to coat interiors of water heater tanks.

SUMMARY OF THE INVENTION

My corrosion inhibiting system is used as an adjunct in coating compositions. The binder in these compositions can be any of those customarily used in the art, provided it does not significantly affect the corrosion-inhibiting ability of the system. Illustrative of such binders are alkali metal silicates, particularly lithium polysilicate; partially hydrolyzed tetraethyl orthosilicate; polytetrafluoroethylene; copolymers of tetrafluoroethylene and hexafluoropropylene in all monomer unit ratios; polyvinyl fluoride; polyvinylidene fluoride; polyvinyl chloride; polyvinylidene chloride; polyvinyl acetate; polyvinyl alcohol; copolymers of all these; epoxy resins; aminoplast resins; phenol-formaldehyde resins; acrylic resins; polyurethanes; alkyd resins; and mixtures of these.

These binders will be present in my compositions in conventional amounts, well known in the paint formulating art.

The metallic zinc I use in my compositions is in particulate form, either powder or flake, although I prefer the powder form because it is easier to formulate. In the ordinary circumstance, my compositions will contain about 50% through about 900%, preferably 100% through about 700%, and even more preferably about 85% through about 350%, by weight of the binder components, of particulate zinc.

When I say "water-insoluble zinc salt", I mean a zinc salt no more than 0.1 gram of which will dissolve in 100 milliliters of water at 25°C. Illustrative of such salts are the phosphate, chromate, citrate, oxalate, borate, carbonate, ferricyanide, oxide, pyrophosphate and sulfide. Mixtures of salts can also be used.

I prefer to use zinc phosphate, particularly in compositions used to line water heater tanks.

The amount of water-insoluble zinc salt used in my compositions will depend upon the amount of particulate zinc used in the composition, the type of binder component used and the degree of corrosion-inhibition required of the composition. Generally speaking, the water-insoluble zinc salt will be present at a concentration of about 5% through about 100%, by weight of the binder components, preferably about 25% through about 75%, and even more preferably (especially in the case of zinc phosphate) about 40–60%.

The carrier I use in my compositions can be any normally used in galvanic action coating compositions, and which does not significantly interfere with the composition's intended use. For example, it can be water; an aliphatic or aromatic hydrocarbon, or mixture of these. In the usual case, the carrier is a mixture of liquids which finds its way into the composition as a solvent or carrier for the solid and resinous components.

Generally speaking, the nature of the liquid is of secondary importance. It serves only to keep the composition homogeneous, and acts as a mechanism for conveying the solid components to the substrate. After the coating has been deposited, the liquid evaporates. It is necessary, therefore, only that it be compatible with the other components of the composition and that it have no adverse affects on the coating itself.

My compositions are ordinarily not shaded to any particular color. Colorants can be added, but one must exercise care when doing this because the compositions are already well loaded with solids and the addition of too much colorant could adversely affect the quality of the resulting film. I have found that if colors are required, it is much preferable to coat the corrosion-inhibiting finish with a decorative topcoat.

The stability and blister resistance of coatings derived from my compositions can be enhanced by adding to the compositions about 0.1% through about 5%, by weight of the binder components, of a hydrophobic silica such as that sold by the Philadelphia Quartz Company as "QUSO". I prefer to use about 0.5% to about 1.5%, even more preferably 1% of this material.

DESCRIPTION OF PREFERRED EMBODIMENT

When my corrosion-inhibiting system is used in water heater tank linings, I have found that it functions best in a coating composition which contains dispersed particles of polyvinylidene fluoride, an epoxy resin, and an aminoplast resin, all in an organic liquid carrier.

The polyvinylidene fluoride I use in this composition is of the type described in U.S. Pat. No. 2,435,537. Such resins are freely available on the market. The resin I prefer to use is "Kynar", sold by Pennwalt Chemical Company.

Polyvinylidene fluoride is ordinarily present in this composition at a concentration of 5% through about 90%, preferably 25% through about 75%, and even more preferably about 50%, by weight of the binder components.

The epoxy resin in this composition can be any of the well-known condensation products of Bisphenol A[1] or Bisphenol F[2] with epichlorohydrin, and having gram epoxy equivalent weights of 300–8000, preferably 400–4000, even more preferably 400–2500. The epoxy resins I especially prefer for the quality of the finishes obtained when they are used are the "Epon" 1001 through 1009 resins, sold by the Shell Chemical Company.

[1.] para,para-isopropylidene diphenol
[2.] 4,4'-dihydroxydiphenylmethane

These epoxy resins are ordinarily present in this composition at a concentration of about 5% through about 90%, preferably about 20% through about 60%, and even more preferably about 35%, by weight of the binder components.

The aminoplast resins I use in this composition are condensates of formaldehyde with melamine, urea, benzoguanamine or melaminetoluenesulfonamide. These resins can be prepared according to directions in U.S. Pat. Nos. 2,197,357, 2,508,875 and 2,191,957. I prefer to use a benzoguanamine-formaldehyde resin because of the quality of the coating obtained when it is used.

The aminoplast resins are ordinarily present in my compositions at concentrations of from 5% through about 90%, preferably 5–25%, even more preferably about 15%, by weight of the binder components.

Although my compositions are most useful for coating the interior surfaces of water heater tanks, they are also useful for lining boilers, the interior surfaces of pipes and drums, industrial containers, indeed any surface which must come in contact with water at elevated temperatures.

How My Compositions are Made

A composition containing my corrosion-inhibiting system can be made by blending suitable amounts of the components, less the zinc, in a vessel and then pebble-milling or ball-milling the resulting mixture for from 10 to 18 hours, or until the binder components are wetted and deagglomerated. The resulting dispersion will ordinarily contain about 40% through about 80%, by weight of the total composition, of solid material, preferably 40% to 60%. An appropriate amount of zinc is then stirred into this dispersion.

If necessary, this can be reduced to spray viscosity with a compatible thinner. It can then be sprayed directly on the surface to be coated. The compositions can be applied directly to treated or untreated grit-blasted steel and then baked at 450°–500°F. for 10 to 30 minutes. Compositions containing my corrosion inhibiting system work especially well when applied to zinc phosphate treated steel.

While one such coating gives excellent protection against corrosion, I have found that even better protection is obtained if two or three or more separate coats are applied, each 1 to 3 mils thick (dry) and each baked after application for 10 minutes at 400°–500°F. The final coating is preferably baked for 20 minutes at 475°F.

EXAMPLE

One will be able to practice my invention more easily after reading the following illustrative example.

Those skilled in the art will no doubt be able to compose numerous variations on its central theme, such as the substitution of equivalent materials or the addition or deletion of innocuous components. I naturally consider these variations to be within my inventive concept.

In the example all parts are by weight.
A composition was prepared by mixing together

|  | Parts |
|---|---|
| Zinc phosphate | 16.81 |
| Hydrophobic silica "Ouso" 51 | 0.34 |
| Polyvinylidene fluoride | 16.81 |
| Benzoguanamine-formaldehyde resin (66% solids in n-butanol) | 7.63 |
| Diacetone alcohol | 14.5 |
| Solvesso 150 | 14.5 |
| Epoxy resin (Epon 1007, a 40% solution in a 50/50 blend or aromatic hydrocarbon and diacetone alcohol) | 29.4 |

The resulting dispersion was pebble-milled for about 18 hours.

To 65.6 parts of this dispersion were added 33.3 parts of zinc dust, 0.5 part of Solvesso 100 and 0.5 part of diacetone alcohol. This was mixed thoroughly, reduced to spray viscosity with Solvesso 100 and then applied in three separate coats to a grit-blasted, zinc-phosphate treated steel panel. The first two coats where applied to a thickness of 1 mil (dry) and baked for 10 minutes at 475°F. The third coat was applied at the same thickness but baked for 20 minutes at 475°F.

This panel was then scored to bare metal and placed in a salt-spray testing chamber, where it withstood over 2000 hours of exposure without significant bleeding.

I claim:
1. In a galvanic action corrosion-inhibiting coating composition suitable for lining the interior surface of a water heater tank, the composition consisting essentially of
   a. polyvinylidene fluoride, 5–90% by weight of the binder components;
   b. a condensation product of Bisphenol A or Bisphenol F and epichlorohydrin, 5–90% by weight of the binder components;
   c. an aminoplast resin, 5–90% by weight of the binder components;
   d. particulate zinc, 50–900% by weight of the binder components; and
   e. a liquid carrier;
the improvement comprising the presence in the composition of an effective amount of zinc phosphate.
2. The composition of claim 1 wherein the aminoplast resin is a benzoguanamine-formaldehyde resin.
3. A water heater the interior surface of whose tank is coated with a finish derived from the composition of claim 1.
4. A water heater the interior surface of whose tank is coated with a finish derived from the composition of claim 2.

* * * * *